United States Patent
Tada et al.

(10) Patent No.: US 7,208,555 B2
(45) Date of Patent: Apr. 24, 2007

(54) PROCESS FOR PREPARING POLYVINYLIDENE FLUORIDE COPOLYMER

(75) Inventors: Masahito Tada, Fukushima (JP); Takumi Katsurao, Fukushima (JP); Tsukasa Ikeda, Fukushima (JP); Kazuyuki Suzuki, Fukushima (JP)

(73) Assignee: Kureha Chemical Industry Company, Limited, Tokyo (JP)

(*) Notice: Subject to any disclaimer, the term of this patent is extended or adjusted under 35 U.S.C. 154(b) by 0 days.

(21) Appl. No.: 10/528,654

(22) PCT Filed: Sep. 17, 2003

(86) PCT No.: PCT/JP03/11813

§ 371 (c)(1), (2), (4) Date: Mar. 22, 2005

(87) PCT Pub. No.: WO2004/029109

PCT Pub. Date: Apr. 8, 2004

(65) Prior Publication Data
US 2005/0245708 A1 Nov. 3, 2005

(30) Foreign Application Priority Data
Sep. 25, 2002 (JP) .............. 2002-278334

(51) Int. Cl.
B01D 17/04 (2006.01)
B01D 21/01 (2006.01)
C08F 6/24 (2006.01)
C08F 22/38 (2006.01)
B32B 27/00 (2006.01)
C02F 1/54 (2006.01)
C02F 1/66 (2006.01)

(52) U.S. Cl. .............. 526/250; 526/242; 526/307; 526/923; 528/490; 528/502; 428/422; 428/500; 210/702; 210/703; 210/705; 210/723; 156/182

(58) Field of Classification Search .......... 526/250, 526/242; 201/704, 705, 710, 198.1; 528/490, 528/502; 428/422, 500; 210/705, 708; 156/182
See application file for complete search history.

(56) References Cited

U.S. PATENT DOCUMENTS 3,256,251 A * 6/1966 Carey .............. 528/500
4,454,047 A * 6/1984 Becker et al. .............. 210/705
5,547,761 A * 8/1996 Chapman et al. .......... 428/422
6,268,469 B1 * 7/2001 Hiraga et al. .............. 528/490
6,372,388 B1 * 4/2002 Katsurao et al. ........... 429/316
2002/0100725 A1 8/2002 Lee et al.

FOREIGN PATENT DOCUMENTS

| JP | 55-126905 A | 10/1980 |
|---|---|---|
| JP | 59-215096 A | 12/1984 |
| JP | 59-215097 A | 12/1984 |
| JP | 61-48983 A | 3/1986 |
| JP | 64-16853 A | 1/1989 |
| JP | 1-167732 A | 7/1989 |
| JP | 1-256047 A | 10/1989 |
| JP | 1-256098 A | 10/1989 |
| JP | 04-311711 * | 4/1992 |
| JP | 0 508 802 A1 | 10/1992 |
| JP | 0-508802 A1 * | 10/1992 |
| JP | 05-08802 A1 * | 10/1992 |
| JP | 04-311711 | 11/1992 |
| JP | 6-150684 A | 5/1994 |
| JP | 06-265929 | 9/1994 |
| JP | 2002-249966 | 9/2002 |

OTHER PUBLICATIONS

The American Heritage College Dictionary, 4th Ed, p. 366.*

* cited by examiner

*Primary Examiner*—Duane Smith
*Assistant Examiner*—Ives Wu
(74) *Attorney, Agent, or Firm*—McDermott Will & Emery LLP

(57) ABSTRACT

The present invention provides a polyvinylidene fluoride copolymer capable of forming a uniform film, a solution of the copolymer and a thin film comprising the polyvinylidene fluoride copolymer. The polyvinylidene fluoride copolymer of the present invention is characterized in that the ratio of the scattered-light intensity (I) for a 15% solution of the polyvinylidene fluoride copolymer in dimethylformamide solvent to the scattered-light intensity ($I_0$) for dimethylformamide, ($I/I_0$), is 10 or lower. The polyvinylidene fluoride copolymer solution comprises the polyvinylidene fluoride copolymer and an organic solvent capable of dissolving the copolymer.

4 Claims, No Drawings

US 7,208,555 B2

PROCESS FOR PREPARING POLYVINYLIDENE FLUORIDE COPOLYMER

TECHNICAL FIELD

The present invention relates to a polyvinylidene fluoride copolymer suitable for forming a thin film excellent in electricity-proof, a solution of the polyvinylidene fluoride copolymer and a thin film comprising the polyvinylidene fluoride copolymer.

BACKGROUND ART

Polyvinylidene fluoride resin has been widely known as a resin having a ferroelectric property, and has been used for pyroelectric sensors, acoustic sensors, speakers and so on, taking advantage of the property of the resin. In recent years, examination is carried out for application to recording devices which utilize the ferroelectric property of the resin. For example, optical memory devices utilizing the ferroelectric property of polyvinylidene fluoride resin have been proposed (Japanese Patent Laid-open No.SHO 55-126905, Japanese Patent Laid-open No.SHO 59-215096, Japanese Patent Laid-open No.SHO 59-215097, Japanese Patent Laid-open No.SHO 64-16853, Japanese Patent Laid-open No.HEI 1-256047, Japanese Patent Laid-open No.HEI 1-256098). Moreover, ferroelectric memories using polyvinylidene fluoride resin (Japanese Patent Laid-open No.SHO 61-48983, Japanese Patent Laid-open No.HEI 6-150684, PCT International Publication No. WO99-12170) and an active matrix substrate using polyvinylidene fluoride resin (Japanese Patent Laid-open No.HEI 1-167732) have also been proposed.

In using polyvinylidene fluoride resin for the above mentioned purposes, there is an advantage that a mass storage medium can be obtained easily. In order to give a ferroelectric property to a polyvinylidene fluoride copolymer, polarization is necessary. When thin films are made remarkably thinner in order to increase the capacity, there is also an advantage that voltage used for polarization can be made low. Furthermore, there is also an advantage that the bit density (packing density) can be improved by laminating the thin films However, there is a problem in that it is difficult for the polyvinylidene fluoride resin to form a uniform thin film. Especially, in the case in which thin films and electrodes are formed and laminated on a semiconductor substrate or a metal substrate, a homogeneous laminated product cannot be obtained unless the thin films are uniform. When high electric field is applied on an uneven thin film, the problem of short-circuit or the properties within the thin film becoming uneven will arise.

The present invention has been accomplished to solve the above problems in thin film formation of polyvinylidene fluoride resin, and an object of the present invention is to provide a polyvinylidene fluoride copolymer capable of forming a uniform thin film and also to provide a solution of the copolymer. Another object of the present invention is to provide a thin film comprising a polyvinylidene fluoride copolymer and to provide a ferroelectric thin film of a polyvinylidene fluoride copolymer, in which the thin film is polarized.

DISCLOSURE OF THE INVENTION

The present invention is directed to a polyvinylidene fluoride copolymer characterized in that the ratio of the scattered-light intensity (I) for a 15% solution of the polyvinylidene fluoride copolymer in dimethylformamide solvent to the scattered-light intensity ($I_0$) for dimethylformamide, ($I/I_0$), is 10 or lower.

The present invention is also directed to a polyvinylidene fluoride copolymer solution comprising the above mentioned polyvinylidene fluoride copolymer and an organic solvent capable of dissolving the copolymer.

The present invention is also directed to a thin film comprising the polyvinylidene fluoride copolymer according to the above-mentioned present invention.

Further, the present invention is also directed to a thin film comprising the polyvinylidene fluoride copolymer according to the above-mentioned present invention, wherein the thin film is polarized. This polarized thin film has a ferroelectric property.

It is supposed that a polyvinylidene fluoride copolymer obtained by polymerization reaction is composed of many kinds of copolymers having various levels of molecular weight. The present inventors have thought that a uniform thin film of a polyvinylidene fluoride copolymer can be obtained if a copolymer having a relatively low molecular weight can be selectively took out from those copolymers having various levels of molecular weight. Thereupon, the present inventors have devised a method by which a polyvinylidene fluoride copolymer having relatively high molecular weight is selectively removed from the copolymers after polymerization and a polyvinylidene fluoride copolymer having relatively low molecular weight is selectively obtained. The present inventors have compared the copolymer selectively obtained as above with a copolymer obtained without such separating operation. As a result, it has been found that the polyvinylidene fluoride resin selectively obtained and supposed to have a relatively low molecular weight is suitable for producing a uniform thin film.

In accordance with the present inventors' investigation, it has been found that the difference between the properties of a polyvinylidene fluoride copolymer selectively obtained through a separating operation and a polyvinylidene fluoride copolymer obtained without a separating operation can be clearly discerned by comparison using an optical means although the difference cannot be discerned by comparison with inherent viscosities of the above copolymers.

It is possible by the operations of separation and recovering as illustrated later to obtain only a polyvinylidene fluoride copolymer supposed to have a relatively low molecular weight from the polyvinylidene fluoride copolymer after polymerization. For example, after polymerization, slurry or wet cake of a polyvinylidene fluoride copolymer is dispersed into water or an organic solvent in which the copolymer is insoluble, and the resulting mixture is stirred. After stirring, the mixture is settled. Then, only the copolymer floating in the upper part of the mixture is selectively recovered. By means of repeating the separation and recovering operations, a polyvinylidene fluoride copolymer having more preferable properties can be obtained.

The present inventors have found that the properties of the polyvinylidene fluoride copolymer can be defined by measuring the scattered-light intensity (I) for 15% solution of the polyvinylidene fluoride copolymer in dimethylformamide solvent and calculating the ratio ($I/I_0$), namely, the ratio of the scattered-light intensity (I) to the scattered-light intensity ($I_0$) for blank, i.e. dimethylformamide. The present inventor have also found the followings; When the ratio ($I/I_0$) of the scattered-light intensity of the polyvinylidene fluoride copolymer is 10 or lower, a uniform thin film can be obtained from the copolymer dissolved in a solvent. Therefore, the thin film can be polarized without any problems when electrodes are formed on the surfaces of the thin film and a voltage is applied on the thin film. The ratio ($I/I_0$) of the scattered-light intensity of the polyvinylidene fluoride copolymer is preferably less than 6, and the smaller scattered-light intensity is more preferable. When the above mentioned separating and recovering operations are repeated so many times, a polyvinylidene fluoride copolymer having a ratio ($I/I_0$) of the scattered-light intensity of a smaller value can be obtained.

In the present invention, the polyvinylidene fluoride copolymer is at least one selected from a copolymer of vinylidene fluoride and monofluoroethylene; a copolymer of vinylidene fluoride and trifluoroethylene; a copolymer of vinylidene fluoride and tetrafluoroethylene; a copolymer of vinylidene fluoride and hexafluoropropylene; a copolymer of vinylidene fluoride, trifluoroethylene and tetrafluoroethylene; a copolymer of vinylidene fluoride, trifluoroethylene and chlorotrifluoroethylehe; a copolymer of vinylidene fluoride, trifluoroethylene and hexafluoropropylene; and a copolymer of vinylidene fluoride, tetrafluoroethylene and hexafluoropropylene.

Of the above copolymers, the copolymer of vinylidene fluoride and trifluoroethylene having superior polarizability is especially preferable for the purpose of use in which the thin film of the polyvinylidene fluoride resin is polarized by applying electric field.

It is preferred that the polyvinylidene fluoride copolymer of the present invention contains not less than 40 mol % and not more than 90 mol % of vinylidene fluoride. When the content of vinylidene fluoride is less than 40 mol %, the thin film formed from the copolymer is difficult to have ferroelectricity. When the content of vinylidene fluoride is more than 90 mol %, the thin film formed from the copolymer is difficult to have not only ferroelectricity but also uniformity. The more preferable range of the amount of vinylidene fluoride in the copolymer is not less than 50 mol % and not more than 85 mol %.

A polyvinylidene fluoride copolymer can be obtained by polymerizing monomers which constitute the copolymer through public known methods such as solution polymerization, emulsion polymerization, suspension polymerization and so on. Of these polymerization methods, suspension polymerization is preferable. In suspension polymerization, vinylidene fluoride monomer and another monomer copolymerizable with vinylidene fluoride monomer are dispersed in water by using a suspension agent, and polymerization is carried out in the presence of polymerization initiator which is soluble in the formed liquid-drops of the monomer. Then, the polyvinylidene fluoride copolymer, whose after-treatment is easy, can be obtained. Besides, the copolymer is superior in processability, mechanical property and thermal-stability.

The polyvinylidene fluoride copolymer according to the present invention can be prepared by the following recovering method. That is, after polymerization, slurry or wet cake of a polyvinylidene fluoride copolymer is dispersed in water or an organic solvent in which the copolymer is insoluble, and the resulting mixture is stirred. After stirring, the mixture is settled. After settling, the copolymer particles floating in the upper part of the mixture are separated from the copolymer particles precipitated in the lower part of the mixture and then the copolymer particles floating in the upper part of mixture are recovered. That is to say, the copolymer particles having a large molecular weight are removed by stirring and settling. By repeating the operations of stirring, settling and separation, the copolymer particles having large molecular weight are further removed and more homogeneous copolymer particles can be recovered.

The organic solvent, in which the polyvinylidene fluoride copolymer is insoluble, includes alcohols such as methyl alcohol, ethyl alcohol, isopropyl alcohol, ethylene glycol and so on; saturated hydrocarbon such as pentane, hexane, decane, tetradecane, tridecane and so on; aromatic hydrocarbon such as benzene, toluene, xylene and so on; organic halogen compounds such as carbon tetrachloride, dichloroethylene, trichloroethylene, o-dichlorobenzene and so on.

When slurry or wet cake of a polyvinylidene fluoride copolymer is dispersed in water or an organic solvent in which the copolymer is insoluble, and the resulting mixture is stirred, water or the organic solvent of 2 to 20 times as much as the volume of the slurry or the wet cake is used. When the volume of water or the organic solvent is less than 2 times as much as the volume of the slurry or the wet cake, it is difficult to remove relatively heavy copolymer particles. When the volume of water or the organic solvent is more than 20 times as much as the volume of the slurry or the wet cake, separation cannot be carried out efficiently.

It is preferred that separation, stirring and settling are carried out at a temperature of above room temperature and below 100° C., from a viewpoint that components such as polymerization auxiliaries can be removed simultaneously. The more preferable temperature is from 50° C. to 98° C. The period for settling, which depends upon the volume of the polyvinylidene fluoride copolymer and the volume of water or the organic solvent, is about from 10 minutes to 3 hours, preferably from 20 minutes to 1 hour.

A solution of a polyvinylidene fluoride copolymer suitable for forming a thin film can be obtained by dissolving the polyvinylidene fluoride copolymer according to the present invention into an organic solvent capable of dissolving the copolymer. The organic solvent capable of dissolving the polyvinylidene fluoride copolymer includes acetone, tetrahydrofuran (THF), methyl ethyl ketone (MEK), dimethylformamide (DMF), dimethylacetamide, tetramethylurea, trimethyl phosphate, methyl isobutyl ketone (MIBK), butyl acetate, cyclohexanone, diacetone alcohol, diisobutyl ketone (DIBK), butyl lactone, tetraethylurea, isophorone, triethyl phosphate, carbitol acetate, diethyl carbonate (DEC), propylene carbonate, dimethyl phthalate, N-methylpyrrolidone; esters such as ethyl acetate, butyl acetate, methyl methacrylate, ethyl acrylate and so on; amines such as dimethylamine, triethylamine, aniline and so on; ethers such as ethyl ether, butyl ether, dioxane, ethylene oxide, cyclohexane and so on; cyanides such as acrylonitrile and so on; organic acid such as acetic anhydride and so on. If necessary, two or more of these organic solvents can be used together. Of the above mentioned organic solvents, acetone, tetrahydrofuran, MEK, dimethylformamide, dimethylacetamide, tetramethylurea, trimethyl phosphate, diethyl carbonate, N-methylpyrrolidone are preferable from viewpoints that these solvents dissolves the polyvinylidene fluoride copolymer immediately and that these solvents can be easily removed when the thin film is formed. Above all, diethyl carbonate is especially preferable because its solution is not colored and has superior stability, its volatility is easily controlled when a thin film is formed, and it has low toxicity.

When a solution is obtained from a polyvinylidene fluoride copolymer and an organic solvent capable of dissolving the copolymer, it is preferred that the solution is suitably heated or stirred to dissolve the copolymer rapidly. In order to suppress a change in quality of the copolymer, it is preferred that the copolymer is dissolved in the solvent under an inert gas atmosphere.

The mixing amounts of the polyvinylidene fluoride copolymer and the organic solvent capable of dissolving the copolymer are as follows; namely, from 100 to 10,000 parts by weight of the organic solvent should be mixed with 100 parts by weight of the polyvinylidene fluoride copolymer. When the mixing amount of the organic solvent is less than 100 parts by weight per 100 parts by weight of the polyvinylidene fluoride copolymer, the solution becomes sticky and it is difficult to obtain a uniform thin film. When the mixing amount of the organic solvent is more than 10,000 parts by weight per 100 parts by weight of the polyvinylidene fluoride copolymer, it is difficult to control the thickness of the thin film. The mixing amount of the organic solvent is preferably from 400 to 5,000 parts by weight, more preferably from 600 to 2,000 parts by weight.

It is harmless that various auxiliaries such as antioxidant, adhesion-improving agent, crystal nucleus-forming agent and so on are added, if necessary, to the solution containing the polyvinylidene fluoride copolymer and the organic solvent capable of dissolving the copolymer, within the scope of the aim of the present invention.

After the solution of the polyvinylidene fluoride copolymer and the organic solvent capable of dissolving the copolymer is applied on a substrate, a thin film comprising the above mentioned polyvinylidene fluoride copolymer can be obtained by evaporating the organic solvent.

By an infrared analysis, the thin film comprising the polyvinylidene fluoride copolymer according to the present invention contains polar crystals. Therefore, a ferroelectric thin film, which is polarized, can be obtained by applying a polarizing voltage of about from 30 to 100 V/μm through a DC power source for about 0.1 to 60 minutes. According to the present invention, a uniform thin film comprising a polyvinylidene fluoride copolymer can be obtained. Consequently, problems such as short-circuit are not caused, even if the high electric field for polarization is applied.

BEST MODE FOR CARRYING OUT THE INVENTION

Hereinafter, the present invention is illustrated in detail by examples, which are not intended as limiting the scope of the present invention. In the examples, the properties were measured as follows:

[Measurement of Scattered-light Intensity]

A Polyvinylidene fluoride copolymer or a resin of a polyvinylidene fluoride copolymer (hereinafter, referred to as "the polymer") and dimethylformamide (DMF) were placed into a glass vessel. The concentration of the polymer in the mixture of the polymer and DMF was adjusted to be 15%. This mixture was heated up to 50° C. and then, stirred for one hour, so that the polymer was solved in DMF. After cooling to room temperature, the resultant solution was placed into a quartz glass vessel and the scattered-light intensity (I) was measured by using a Submicron Particle Analyzer; N4SD model produced by Beckman Coulter Inc. in USA. Next, DMF was placed into a quartz glass vessel and then, the scattered-light intensity ($I_0$) for only solvent, i.e. DMF, was measured in the same manner as above. Then, the ratio of the scattered-light intensities, ($I/I_0$), was calculated from (I) and ($I_0$).

[Measurement of Surface Roughness]

Surface roughness of a thin film comprising a resin of polyvinylidene fluoride copolymer was measured by using a microscope for measuring ultra-depth-shape (3D profile microscope); VK-8500 model produced by Keyence corp. under the conditions of 50 times in optical magnification, 298 μm of longitudinal direction and 223 μm of transverse direction in the measurement range and 0.01 μm in pitch.

EXAMPLE 1

8192 g of ion exchanged water, 3.2 g of methyl cellulose, 25.6 g of di-n-propylperoxydicarbonate, 2461 g of vinylidene fluoride and 739 g of trifluoroethylene were charged into an autoclave of 10 liters in capacity. The charge molar ratio of vinylidene fluoride to trifluoroethylene was 81/19. The above contents of the autoclave were heated up to 25° C. for one hour and then the contents of the autoclave were subjected to suspension polymerization for 20.7 hours from the beginning of heating. After completion of the polymerization, the slurry of the polymer was dehydrated and the obtained wet cake was transferred into a washing can.

Next, pure water of about five times as much as the amount of the wet cake was poured into the above-mentioned washing can and the resulting mixture was stirred for one minute. After that, the stirring was stopped and the mixture in the washing can was settled for 60 minutes. As the result, the polymer particles were separated into particles floating in the upper part of the mixture in the washing can and particles precipitated in the lower part of the mixture in the washing can.

In order to separate these particles, the pure water used for washing and particles precipitated in the lower part of the mixture in the washing can were removed from the bottom of the can, and the polymer particles which had been floating in the upper part of the washing can were left in the can. Pure water of five times as much as the amount of the polymer particles left in the can were poured into the washing can, and the consecutive operations of stirring, settling and separation were repeated three times.

After washing with water, dehydration was performed by using a centrifugal separator and then wet cake was recovered. The wet cake was dried at 80° C. for 20 hours and then a resin of a polyvinylidene fluoride copolymer was obtained. The polymerization percentage was 89% and the inherent viscosity of the resulting resin was 1.44 dl/g. The inherent viscosity means the logarithmic viscosity of the solution which contains 4 grams of the resin in 1 liter of N,N-dimethylformamide at a temperature of 30° C.

Then, the above resulting resin of the polyvinylidene fluoride copolymer was placed into a glass flask and DMF was added to prepare a solution whose resin concentration was 15%. Next, the solution was stirred for 1 hour, while the temperature was maintained at 50° C., so that the polymer was dissolved in the organic solvent. The scattered-light intensity (I) of this sample was $6.1 \times 10^3$ counts/sec. and the scattered-light intensity ($I_0$) of blank, i.e. only DMF was $3.7 \times 10^3$ counts/sec. From these results, the ratio of the scattered-light intensities, ($I/I_0$), was calculated as 1.65.

The above resin of the polyvinylidene fluoride copolymer was placed into a glass flask, and DMF was added to prepare a polyvinylidene fluoride copolymer solution whose resin concentration was 15%. Next, a glass substrate (80 mm in a diameter), the surface of which was cleaned, was set on a spinner (produced by Mikasa co., ltd. 1H-2D), and about 1 ml of the polyvinylidene fluoride copolymer solution was dropped on the glass substrate. The glass substrate was revolved at 2500 revolutions per one minute for 5 minutes as the first stage and at 4500 revolutions per one minute for 1 minute as the second stage. After that, the organic solvent was evaporated by air drying at room temperature, and a thin film was formed from the resin of the polyvinylidene fluoride copolymer. The resulting thin film was transparent in appearance. The surface roughness of this thin film was measured and the arithmetic average roughness (Ra) was calculated as 0.12 µm.

Au (gold) was deposited on a glass substrate which was cleaned. Then, the same operations as above to form a thin film of the resin of the polyvinylidene fluoride copolymer were carried out on the Au electrode. Further, the thin film was heated under a reduced pressure (about 4,000 Pa) at 120° C. for 0.5 hours and then at 80° C. for 20 hours, so that the solvent in the thin film was completely removed. The infrared spectroscopy of this thin film was measured by using an infrared spectrometer (Hitach Co. Ltd. Model:270-30). An absorption peak at 510 cm−1, which is characteristic for a polar crystal, was observed.

An Au electrode was formed by depositing Au on the upper surface of the thin film, from which the solvent had been completely removed. The thickness of the thin film was calculated as 2 µm from the electrostatic capacity, assuming the relative dielectric constant to be 10. Further, the resultant thin film was heated up to 100° C., and a polarization voltage of 130 V was applied to the thin film for 5 minutes by using a DC power source (produced by Kikusui Denki Co. Ltd. POW35-1A). When the thin film was cooled to room temperature, while the voltage was applied, it was possible to polarize the thin film without any problems.

EXAMPLE 2

The resin of the polyvinylidene fluoride copolymer ($I/I_0$=1.65) obtained in Example 1 was placed into a glass flask, and tetrahydrofuran (THF) instead of DMF in Example 1 was added to prepare a solution whose resin concentration was 15%. Next, a thin film comprising the resin of the polyvinylidene fluoride copolymer was formed in the same manner as in Example 1. The resulting thin film was transparent in appearance. The surface roughness of this thin film was measured and the arithmetic average roughness (Ra) was calculated as 0.10 µm.

Besides, Au electrodes were formed on both surfaces of the thin film of the polyvinylidene fluoride copolymer resin in the same manner as in Example 1. The thickness of the thin film was calculated as 2 µm from the electrostatic capacity, assuming the relative dielectric constant to be 10. A polarization voltage was applied to the thin film in the same manner as in Example 1. When the thin film was cooled to room temperature, while the voltage was applied, it was possible to polarize the thin film without any problems.

EXAMPLE 3

A solution of the polyvinylidene fluoride copolymer was prepared in the same manner as in Example 2 except that the resin concentration of the solution was 5%. Next, a thin film comprising the resin of the polyvinylidene fluoride copolymer was formed in the same manner as in Example 1. The resulting thin film was transparent in appearance. The surface roughness of this thin film was measured and the arithmetic average roughness (Ra) was calculated as 0.10 µm.

Besides, Au electrodes were formed on both surfaces of the thin film of the polyvinylidene fluoride copolymer resin in the same manner as in Example 1. The thickness of the thin film was calculated as 0.5 µm from the electrostatic capacity, assuming the relative dielectric constant to be 10. A polarization voltage was applied to the thin film in the same manner as in Example 1 except that the polarization voltage was set to 33 V. When the thin film was cooled to room temperature, while the voltage was applied, it was possible to polarize the thin film without any problems.

EXAMPLE 4

Suspension polymerization of vinylidene fluoride and trifluoroethylene were carried out in the same manner as in Example 1. The charge molar ratio of vinylidene fluoride to trifluoroethylene was 81/19. After completion of the polymerization, the slurry of the polymer was dehydrated and the obtained wet cake was transferred into a washing can.

Next, the same operations of stirring, settling and separation as in Example 1 were performed only one time. After washing, dehydration was performed by using a centrifugal separator and then wet cake was recovered. The wet cake was dried at 80° C. for 20 hours and then a resin of a polyvinylidene fluoride copolymer was obtained. The inherent viscosity of the resulting resin was 1.45 dl/g.

When the scattered-light intensity (I) of the obtained resin of the polyvinylidene fluoride copolymer was measured in the same manner as in Example 1, it was $32.4 \times 10^3$ counts/sec. The scattered-light intensity ($I_0$) of blank, i.e. only DMF was $3.7 \times 10^3$ counts/sec. From these results, the ratio of the scattered-light intensities, ($I/I_0$), was calculated as 8.76.

Next, a thin film was formed from the resin of the polyvinylidene fluoride copolymer in the same manner as in Example 1. The resulting thin film was transparent in appearance. The surface roughness of this thin film was measured and the arithmetic average roughness (Ra) was calculated as 0.32 µm.

Besides, Au electrodes were formed on both surfaces of the thin film of the polyvinylidene fluoride copolymer resin in the same manner as in Example 1. The thickness of the thin film was calculated as 2 µm from the electrostatic capacity, assuming the relative dielectric constant to be 10. A polarization voltage was applied to the thin film in the same manner as in Example 1. When the thin film was cooled to room temperature, while the voltage was applied, it was possible to polarize the thin film without any problems.

EXAMPLE 5

8013 g of ion exchanged water, 1.57 g of methyl cellulose, 18.8 g of di-iso-propylperoxydicarbonate, 31.3 g of ethyl acetate, 2410 g of vinylidene fluoride and 720 g of hexafluoropropylene were charged into an autoclave of 10 liters in capacity. The charge molar ratio of vinylidene fluoride to hexafluoropropylene was 89/11. The above contents of the autoclave were heated up to 28° C. for one hour and then the contents of the autoclave were subjected to suspension polymerization for 23 hour from the beginning of heating. After completion of the polymerization, the slurry of the polymer was dehydrated and the obtained wet cake was transferred into a washing can. Then, the same operations of stirring, settling and separation as in Example 1 were repeated three times.

After washing, dehydration was performed by using a centrifugal separator and then wet cake was recovered. The wet cake was dried at 80° C. for 20 hours and then a resin of a polyvinylidene fluoride copolymer was obtained. The polymerization percentage was 88% and the inherent viscosity of the resulting resin was 1.28 dl/g.

When the scattered-light intensity (I) of the obtained resin of the polyvinylidene fluoride copolymer was measured in the same manner as in Example 1, it was $5.7 \times 10^3$ counts/sec. The scattered-light intensity ($I_0$) of blank, i.e. only DMF was $3.7 \times 10^3$ counts/sec. From these results, the ratio of the scattered-light intensities, ($I/I_0$), was calculated as 1.54.

The above obtained resin of the polyvinylidene fluoride copolymer was placed into a glass flask and THF was added to prepare a solution whose resin concentration was 5%. Next, a thin film was formed from the resin of the polyvinylidene fluoride copolymer in the same manner as in Example 1. The resulting thin film was transparent in appearance. The surface roughness of this thin film was measured and the arithmetic average roughness (Ra) was calculated as 0.04 µm.

Besides, Au electrodes were formed on both surfaces of the thin film of the polyvinylidene fluoride copolymer resin in the same manner as in Example 1. The thickness of the thin film was calculated as 0.5 µm from the electrostatic capacity, assuming the relative dielectric constant to be 10. A polarization voltage was applied to the thin film in the same manner as in Example 1 except that the polarization voltage was set to 33 V. When the thin film was cooled to room temperature, while the voltage was applied, it was possible to polarize the thin film without any problems.

EXAMPLE 6

600 g of ion exchanged water, 0.3 g of methyl cellulose, 2.0 g of di-iso-propylperoxydicarbonate, 120 g of vinylidene fluoride, 30 g of tetrafluoroethylene and 50 g of hexafluoropropylene were charged into an autoclave of 1 liter in capacity. The charge molar ratio of vinylidene fluoride/tetrafluoroethylene/hexafluoropropylene was 75/12/13. The above contents of the autoclave were heated up to 35° C. for one hour and then the contents of the autoclave were subjected to suspension polymerization for 20.5 hour from the beginning of heating. After completion of the polymerization, the slurry of the polymer was dehydrated and the obtained wet cake was transferred into a washing can. Then, the same operations of stirring, settling and separation as in Example 1 were repeated three times.

After washing, dehydration was performed by using a centrifugal separator and then wet cake was recovered. The wet cake was dried at 80° C. for 20 hours and then a resin of a polyvinylidene fluoride copolymer was obtained. The polymerization percentage was 97% and the inherent viscosity of the resulting resin was 1.23 dl/g.

When the scattered-light intensity (I) of the obtained resin of the polyvinylidene fluoride copolymer was measured in the same manner as in Example 1, it was $5.5 \times 10^3$ counts/sec. The scattered-light intensity ($I_0$) of blank, i.e. only DMF was $3.7 \times 10^3$ counts/sec. From these results, the ratio of the scattered-light intensities, ($I/I_0$), was calculated as 1.49.

Next, the above obtained resin of the polyvinylidene fluoride copolymer was placed into a glass flask in the same manner as in Example 1, and THF was added to prepare a solution whose resin concentration was 5%. A thin film comprising the resin of the polyvinylidene fluoride copolymer was formed by using the solution in the same manner as in Example 1. The resulting thin film was transparent in appearance. The surface roughness of this thin film was measured and the arithmetic average roughness (Ra) was calculated as 0.04 µm.

Besides, Au electrodes were formed on both surfaces of the thin film of the polyvinylidene fluoride copolymer resin in the same manner as in Example 1. The thickness of the thin film was calculated as 0.5 µm from the electrostatic capacity, assuming the relative dielectric constant to be 10. A polarization voltage was applied to the thin film in the same manner as in Example 1 except that the polarization voltage was set to 33 V. When the thin film was cooled to room temperature, while the voltage was applied, it was possible to polarize the thin film without any problems.

EXAMPLE 7

The resin of the polyvinylidene fluoride copolymer ($I/I_0=1.65$) obtained in Example 1 was placed into a glass flask and diethyl carbonate (DEC) instead of DMF in Example 1 was added to prepare a solution whose resin concentration was 5%. Next, a thin film comprising the resin of the polyvinylidene fluoride copolymer was formed in the same manner as in Example 1. The resulting thin film was transparent in appearance. The surface roughness of this thin film was measured and the arithmetic average roughness (Ra) was calculated as 0.03 µm.

Besides, Au electrodes were formed on both surfaces of the thin film of the polyvinylidene fluoride copolymer resin in the same manner as in Example 1. The thickness of the thin film was calculated as 0.5 µm from the electrostatic capacity, assuming the relative dielectric constant to be 10. A polarization voltage was applied to the thin film in the same manner as in Example 1 except that the polarization voltage was set to 33 V. When the thin film was cooled to room temperature, while the voltage was applied, it was possible to polarize the thin film without any problems.

COMPARATIVE EXAMPLE 1

The operations to obtain wet cake were conducted in the same manner as in Example 1. Then, a sieve of mesh was installed at the bottom of the washing can, pure water of about five times as much as the amount of the wet cake was poured into the washing can and the resulting mixture was stirred for one minute. After that, the stirring was stopped and the mixture in the washing can was settled for 60 minutes. The pure water used for washing was removed from the bottom of the washing can, and almost the whole amount of the polymer particles were left in the washing can. These consecutive washing operations were repeated three times. After washing with water, dehydration was performed by using a centrifugal separator and then wet cake was recovered. The wet cake was dried at 80° C. for 20 hours and then a resin of a polyvinylidene fluoride copolymer was obtained. The polymerization percentage was 89% and the inherent viscosity of the resulting resin was 1.48 dl/g.

When the scattered-light intensity (I) of the obtained resin of the polyvinylidene fluoride copolymer was measured in the same manner as in Example 1, it was $45.9 \times 10^3$ counts/sec. The scattered-light intensity ($I_0$) of blank, i.e. only DMF was $3.7 \times 10^3$ counts/sec. From these results, the ratio of the scattered-light intensities, ($I/I_0$), was calculated as 12.4.

Next, a thin film comprising the resin of the polyvinylidene fluoride copolymer was formed in the same manner as in Example 1. The resulting thin film was semitransparent in appearance. The surface roughness of this thin film was measured and the arithmetic average roughness (Ra) was calculated as 0.53 μm. Besides, Au electrodes were formed on surfaces of the thin film of the polyvinylidene fluoride copolymer resin in the same manner as in Example 1. The thickness of the thin film was calculated as 2 μm from the electrostatic capacity. When a polarization voltage of 130 V was applied to the thin film for 5 minutes, it short-circuited.

COMPARATIVE EXAMPLE 2

The polyvinylidene fluoride copolymer obtained in Example 1 was placed into a glass flask, and DMF was added to prepare a solution containing the polyvinylidene fluoride copolymer, the concentration of which is 55%. Next, a thin film of the polyvinylidene fluoride copolymer resin was formed on a glass substrate in the same manner as in Example 1. The resulting thin film was semitransparent in appearance. The surface roughness of this thin film was measured and the arithmetic average roughness was calculated as 2.5 μm. The thickness of the thin film was calculated as 7 μm from the electrostatic capacity. When a polarization voltage of 455 V was applied to the thin film for 5 minutes, it short-circuited.

The above Examples and Comparative Examples were shown in Table 1 and 2.

TABLE 1

|  | Example 1 | Example 2 | Example 3 | Example 4 | Comparative Example 1 |
| --- | --- | --- | --- | --- | --- |
| Copolymer composition | 2F:3FH | 2F:3FH | 2F:3FH | 2F:3FH | 2F:3FH |
| Charge molar ratio | 81:19 | 81:19 | 81:19 | 81:19 | 81:19 |
| Processing after Polymerization | Settling and separation 3 times | Settling and separation 3 times | Settling and separation 3 times | Settling and separation 1 time | Centrifugal dehydration |
| Inherent viscosity | 1.44 | 1.44 | 1.44 | 1.45 | 1.48 |
| Light-scattered intensity (I/I$_0$) | 1.65 | 1.65 | 1.65 | 8.76 | 12.4 |
| Measurement of surface roughness |  |  |  |  |  |
| Kind of solvent | DMF | THF | THF | DMF | DMF |
| Concentration of resin | 15% | 15% | 5% | 15% | 15% |
| Surface roughness (μm) | 0.12 | 0.10 | 0.10 | 0.32 | 0.53 |
| Thickness of thin film (μm) | 2 | 2 | 0.5 | 2 | 2 |
| Polarization voltage (V) | 130 | 130 | 33 | 130 | 130 |
| State of polarization | Excellent | Excellent | Excellent | Excellent | Short circuit |

2F: vinylidene fluoride
3FH: trifluoroethylene
DMF: dimethylformamide
THF: tetrahydrofuran

TABLE 2

|  | Example 5 | Example 6 | Example 7 | Comparative Example 2 |
| --- | --- | --- | --- | --- |
| Copolymer composition | 2F:6F | 2F:4F:6F | 2F:3FH | 2F:3FH |
| Charge molar ratio | 89:11 | 75:12:13 | 81:19 | 81:19 |
| Processing after Polymerization | Settling and separation 3 times | Settling and separation 3 times | Settling and separation 3 times | Settling and separation 3 times |
| Inherent viscosity | 1.28 | 1.23 | 1.44 | 1.44 |
| Light-scattered intensity (I/I$_0$) | 1.54 | 1.54 | 1.65 | 1.65 |
| Measurement of surface roughness |  |  |  |  |
| Kind of solvent | THF | THF | DEC | DMF |
| Concentration of resin | 5% | 5% | 5% | 55% |
| Surface roughness (μm) | 0.04 | 0.04 | 0.03 | 2.5 |
| Thickness of thin film (μm) | 0.5 | 0.5 | 0.5 | 7 |
| Polarization voltage (V) | 33 | 33 | 33 | 455 |
| State of polarization | Excellent | Excellent | Excellent | Short circuit |

2F: vinylidene fluoride
3FH: trifluoroethylene
4F: tetrafluoroethylene
6F: hexafluoropropylene
THF: tetrahydrofuran
DEC: diethyl carbonate
DMF: dimethylformamide From the comparison among Example 1, Example 4 and Comparative Example 1 in Table 1, the followings are found. When only the centrifugal dehydration is performed as in Comparative Example 1 without settling and separation after polymerization, the light-scattered intensity of the polyvinylidene fluoride copolymer is over 10, and the thin film short-circuits by polarization. On the other hand, when settling and separation are performed after polymerization, the light-scattered intensity of the polyvinylidene fluoride copolymer is 10 or lower, and the state of polymerization is excellent. Moreover, the number of times of settling and separation increases from 1 time (Example 4) to 3 times (Example 1), the scattered-light intensity of the copolymer becomes remarkably smaller.

It is also found that even if the copolymer compositions different from Example 1 are employed as in Examples 5 and 6 in Table 2, thin films obtained through the operations of settling and separation after polymerization exhibit the ratio of the light-scattered intensity of 10 or lower. Such films are also excellent in the state of polarization. Further, from Examples 2 and 3 in Table 1 or Example 7 in Table 2, it is also found that various solvents are usable for forming the thin film.

In the case of Comparative Example 2 in Table 2, the amount of the organic solvent, capable of dissolving the polyvinylidene fluoride copolymer, is less than 100 parts by weight per 100 parts by weight of the copolymer, the solution becomes sticky and uniform thin film cannot be obtained. And then the thickness of the thin film must be larger. Therefore, higher voltage should be applied to polarize the thin film, and the thin film short-circuits by polarization.

INDUSTRIAL APPLICABILITY

When thin films comprising the polyvinylidene fluoride copolymer resin is prepared by using the polyvinylidene fluoride copolymer according to the present invention, such films have stable properties even if the electric field is applied. These thin films are usable for various sensors such as pyroelectric sensors, piezoelectric sensors and so on, acoustic devices such as micro speakers and so on, and memory media such as optical memory and so on.

The invention claimed is:

1. A process for preparing a polyvinylidene fluoride copolymer, wherein the ratio of the scattered-light intensity (I) for a 15% solution of the polyvinylidene fluoride copolymer in dimethylformamide solvent to the scattered-light intensity ($I_0$) for dimethylformamide, ($I/I_0$), is 10 or lower, wherein
    slurry or wet cake of a polyvinylidene fluoride copolymer obtained by suspension polymerization is dispersed in water or an organic solvent in which the copolymer is insoluble;
    the resulting mixture is stirred;
    after stirring, the mixture is settled;
    after settling, the copolymer particles floating in the upper part of the mixture are separated from the copolymer particles precipitated in the lower part of the mixture;
    the operations of stirring, settling and separation are repeated; and then, the copolymer particles floating in the upper part of the mixture is recovered.

2. A process for preparing a polyvinylidene fluoride copolymer as recited in claim 1, wherein the polyvinylidene fluoride copolymer is at least one selected from a copolymer of vinylidene fluoride and monofluoroethylene; a copolymer of vinylidene fluoride and trifluoroethylene; a copolymer of vinylidene fluoride and tetrafluoroethylene; a copolymer of vinylidene fluoride and hexafluoropropylene; a copolymer of vinylidene fluoride, trifluoroethylene and tetrafluoroethylene; a copolymer of vinylidene fluoride, trifluoroethylene and chlorotrifluoroethylehe; a copolymer of vinylidene fluoride, trifluoroethylene and hexafluoropropylene; and a copolymer of vinylidene fluoride, tetrafluoroethylene and hexafluoropropylene.

3. A process for preparing a polyvinylidene fluoride copolymer as recited in claim 2, wherein the copolymer contains not less than 40 mol % and not more than 90 mol % of vinylidene fluoride.

4. A process for preparing a polyvinylidene fluoride copolymer as recited in claim 1, wherein the operations of stirring, settling and separation are repeated not less than three times.

* * * * *

UNITED STATES PATENT AND TRADEMARK OFFICE
CERTIFICATE OF CORRECTION

| | | |
|---|---|---|
| PATENT NO. | : 7,208,555 B2 | Page 1 of 1 |
| APPLICATION NO. | : 10/528654 | |
| DATED | : April 24, 2007 | |
| INVENTOR(S) | : Masahito Tada et al. | |

It is certified that error appears in the above-identified patent and that said Letters Patent is hereby corrected as shown below:

Title Page,

Item "(56) References Cited", in the listing of "FOREIGN PATENT DOCUMENTS", delete the following three references " JP    0 508 802 A1 *  10/1992
  JP    0-508802 A1 *  10/1992
  JP    05-08802 A1 *  10/1992"

replace with    -- EP    0 508 802 A1 *  10/1992 --;

and delete    " JP    04-311711 *  4/1992".

In the Description,

Column 3, line 24, change "chlorotrifluoroethylehe" to -- chlorotrifluoroethylene --;

In the Claims,

Column 14, line 29, change "chlorotrifluoroethylehe" to -- chlorotrifluoroethylene --.

Signed and Sealed this

Tenth Day of July, 2007

JON W. DUDAS
*Director of the United States Patent and Trademark Office*